United States Patent
Lu et al.

(10) Patent No.: US 10,618,813 B2
(45) Date of Patent: Apr. 14, 2020

(54) CARBON NITRIDE MODIFIED WITH PERYLENETETRACARBOXYLIC DIANHYDRIDE / GRAPHENE OXIDE AEROGEL COMPOSITE MATERIAL, PREPARATION METHOD AND APPLICATION THEREOF

(71) Applicant: SOOCHOW UNIVERSITY, Suzhou (CN)

(72) Inventors: Jianmei Lu, Suzhou (CN); Dongyun Chen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 28 days.

(21) Appl. No.: 16/168,973

(22) Filed: Oct. 24, 2018

(65) Prior Publication Data
US 2019/0127225 A1    May 2, 2019

(30) Foreign Application Priority Data

Oct. 26, 2017   (CN) .......................... 2017 1 1016282

(51) Int. Cl.
| | |
|---|---|
| *B01J 27/24* | (2006.01) |
| *C01B 32/198* | (2017.01) |
| *C01B 21/082* | (2006.01) |
| *B01J 27/20* | (2006.01) |
| *B01J 35/00* | (2006.01) |

(Continued)

(52) U.S. Cl.
CPC ............. *C01B 32/198* (2017.08); *B01J 27/20* (2013.01); *B01J 35/004* (2013.01); *B01J 35/04* (2013.01);

(Continued)

(58) Field of Classification Search
CPC . B01J 27/20; B01J 27/24; B01J 35/004; B01J 35/04; B01J 37/10; B01J 37/32;

(Continued)

(56) References Cited

U.S. PATENT DOCUMENTS

| | | | |
|---|---|---|---|
| 10,243,217 B2 * | 3/2019 | Zhamu ................ | H01M 4/625 |
| 2017/0173571 A1 * | 6/2017 | Lu ....................... | B01J 37/0221 |

FOREIGN PATENT DOCUMENTS

| | | | | |
|---|---|---|---|---|
| CN | 10 6362785 | * | 2/2017 | ............. B01J 27/24 |
| CN | 10 8878555 | * | 11/2018 | ............. B82Y 30/00 |

(Continued)

OTHER PUBLICATIONS

Wen Zhang et al., "Facile synthesis of graphene hybrid tube-like structure for simultaneous detection of ascorbic acid, dopanine, uric acid and tryptophan." Analytica Chimica Acta 756, pp. 7-12. (Year: 2012).*

(Continued)

*Primary Examiner* — Patricia L. Hailey
(74) *Attorney, Agent, or Firm* — SZDC Law P.C.

(57) ABSTRACT

A preparation method of carbon nitride modified with perylenetetracarboxylic dianhydride/graphene oxide aerogel composite material includes: (1) preparing carbon nitride nanosheets by calcination using dicyandiamide as raw material; (2) reacting perylenetetracarboxylic dianhydride and carbon nitride nanosheets in imidazole to prepare carbon nitride modified with perylenetetracarboxylic dianhydride; (3) dispersing said carbon nitride modified with perylenetetracarboxylic dianhydride and graphene oxide into deionized water, freeze-drying after the reaction to obtain carbon nitride modified with perylenetetracarboxylic dianhydride/ graphene oxide aerogel composite material.

9 Claims, 4 Drawing Sheets

(51) Int. Cl.
B01J 35/04 (2006.01)
B01J 37/32 (2006.01)
B01J 37/34 (2006.01)
B01J 37/10 (2006.01)
B82Y 40/00 (2011.01)

(52) U.S. Cl.
CPC ............ B01J 37/10 (2013.01); B01J 37/32 (2013.01); B01J 37/343 (2013.01); C01B 21/0828 (2013.01); *B82Y 40/00* (2013.01); *C01P 2004/03* (2013.01); *C01P 2004/04* (2013.01); *C01P 2006/82* (2013.01)

(58) Field of Classification Search
CPC .. B01J 37/343; C01B 32/198; C01B 21/0828; B82Y 40/00; C01P 2004/03; C01P 2004/04; C01P 2006/82
USPC ........................................................ 502/200
See application file for complete search history.

(56) References Cited

FOREIGN PATENT DOCUMENTS

| CN | 10 9575370 | * | 4/2019 | ................ C08J 3/24 |
| CN | 10 9911891 | * | 6/2019 | ........... C01B 32/194 |

OTHER PUBLICATIONS

Tao Yang, et al., "Enhancement of the corrosion resistance of epoxy coating by highly stable 3,4,9,10-perylene tetracarboxylic acid functionalized graphene." Journal of Hazardous Materials 357, pp. 475-482. (Year: 2018).*

Wailan Xu et al., "A sensitive glucose biosensor based on the abundant immobilization of glucose oxidase on hollow Pt nanospheres assembled on graphen oxide-Prussian Blue-PTC-NH2 nanocomposite film." Journal of Electroanalytical Chemistry 741, pp. 8-13. (Year: 2015).*

Xiuli Niu et al., "Highly sensitive and selective dopamine biosensor based on 3,4,9,10-perylene tetracarboxylic acid functionalized graphene sheets/multi-wall carbon nanotubes/ionic liquid composite film modified electrode." Biosensors and Bioelectronics 41, pp. 225-231. (Year: 2013).*

Xianxue Gan et al., "3,4,9,10-perylene tetracarboxylic acid dianhydride functionalized graphene sheet as labels for ultrasensitive electrochemiluminescent detection of thrombin." Analytica Chimica Acta 726, pp. 67-72. (Year: 2012).*

G. Faubert et al., "Oxygen reduction catalysts for polymer electrolyte fuel cells from the pyrolysis of Fe II acetate adsorbed on 3,4,9,10-perylene tetracarboxylic acid dianhydride." Electrochimica Acta 44, pp. 2589-2603. (Year: 1999).*

* cited by examiner

CARBON NITRIDE MODIFIED WITH PERYLENETETRACARBOXYLIC DIANHYDRIDE / GRAPHENE OXIDE AEROGEL COMPOSITE MATERIAL, PREPARATION METHOD AND APPLICATION THEREOF

This application claims priority to Chinese Patent Application No.: 201711016282.4, filed Oct. 26, 2017, which is incorporated by reference for all purposes as if fully set forth herein.

FIELD OF THE INVENTION

The present invention relates to the field of functional materials, and more particularly to carbon nitride modified with perylenetetracarboxylic dianhydride/graphene oxide aerogel composite material, its preparation method and its use in nitric oxide treatment.

TECHNICAL BACKGROUND

Nitric oxide pollution is a typical gas environmental pollution. With the rapid development of China's economy and industry, the number of cars nationwide is also increasing. The emission of automobile exhaust into the air is the main cause of environmental pollution. Therefore, the concentration level of PM 2.5 (PM is particulate matter) in major cities is much higher than the limit value of national ambient air quality standards. Recently, China has experienced severe haze, and nitrogen oxides (mainly including nitrogen monoxide and nitrogen dioxide) are the main cause in these pollution incidents.

Therefore, developing effective and economical technologies to resolve nitric oxide pollution is an urgent issue. At present, there are many methods for treating nitric oxide, such as physical adsorption, biological filtration, thermal catalytic reduction and selective catalytic reduction, but these methods are uneconomical and inefficient for the treatment of nitric oxide at a low concentration level (level of one-billionth).

Semiconductor photocatalysis is considered to be a promising technology for degrading low-concentration nitric oxide. Due to its high efficiency and environmental characteristics, it has potential value in solving global energy shortage. However, the existing treatment agent for degrading nitric oxide is far from achieving the desired effect.

SUMMARY OF THE INVENTION

The object of the present invention is to provide a carbon nitride modified with perylenetetracarboxylic dianhydride/graphene oxide aerogel composite material and its preparation method, carbon nitride nanosheets are obtained through the molecular polymerization of dicyandiamide under high temperature calcination, then the carbon nitride is modified with perylenetetracarboxylic dianhydride, the above product is mixed with graphene oxide to obtain a hydrogel by hydrothermal reaction, then freeze-dried to obtain aerogels composites composed of carbon nitride modified with perylenetetracarboxylic dianhydride and graphene oxide, to achieve a wide range of applications of this material in the photocatalytic degradation of nitric oxide.

In order to achieve the above object, the specific technical solutions of the present invention are as follows:

A preparation method of carbon nitride modified with perylenetetracarboxylic dianhydride/graphene oxide aerogel composite material, comprising the following steps:

(1) preparing carbon nitride nanosheets by calcination using dicyandiamide as raw material;

(2) reacting perylenetetracarboxylic dianhydride and carbon nitride nanosheets in imidazole to prepare carbon nitride modified with perylenetetracarboxylic dianhydride;

(3) dispersing said carbon nitride modified with perylenetetracarboxylic dianhydride and graphene oxide into deionized water, freeze-drying after the reaction to obtain carbon nitride modified with perylenetetracarboxylic dianhydride/graphene oxide aerogel composite material.

The present invention also discloses A preparation method of carbon nitride modified with perylenetetracarboxylic dianhydride/graphene oxide aerogel composite material, comprising the following steps:

(1) preparing carbon nitride nanosheets by calcination using dicyandiamide as raw material;

(2) reacting perylenetetracarboxylic dianhydride and carbon nitride nanosheets in imidazole to prepare carbon nitride modified with perylenetetracarboxylic dianhydride;

(3) dispersing said carbon nitride modified with perylenetetracarboxylic dianhydride and graphene oxide into deionized water to obtain carbon nitride modified with perylenetetracarboxylic dianhydride/graphene oxide aerogel composite material.

In the above technical scheme, in the step (1), dicyandiamide is placed into a porcelain crucible, and calcined at 400 to 700° C. for 3 to 6 hours at a heating rate of 2 to 15° C. per minute under argon protection, to obtain yellow carbon nitride nanosheets, then ground into powder. A large amount of carbon nitride nanosheets could be obtained easily and efficiently in this condition.

In the above technical scheme, in the step (2), perylenetetracarboxylic dianhydride, carbon nitride nanosheets and imidazole at the mass ratio of 1:30:120 are added to a flask, react at 130 to 160° C. for 4 to 7 hours under argon atmosphere. After the reaction is completed and cooled to room temperature, the product is transferred to an aqueous solution of potassium carbonate, refluxed for 1 to 3 hours, cooled to room temperature, centrifuged, washed with hydrochloric acid, and then washed with water and ethanol until neutral, vacuum dried for 3 to 6 hours. This method modified perylenetetracarboxylic dianhydride to the surface of carbon nitride successfully.

In the above technical scheme, in the step (3), perylenetetracarboxylic dianhydride-modified carbon nitride and graphene oxide with the mass ratio of 3:1 are dispersed in water and sonicated for 2 hours to disperse uniformly; the uniformly dispersed suspension is transferred to a reaction kettle for reaction, the reaction temperature is 160 to 200° C., and time is 5 to 8 hours. After the reaction is finished, naturally cooled to room temperature to obtain a columnar hydrogel; the hydrogel is freeze-dried in a freeze drying oven for 1 to 2 days, and finally the aerogel is obtained. Under these conditions, the target product can be obtained easily, and the material has good conductivity.

In this invention, dicyandiamide act as the initial raw material, to prepare carbon nitride nanosheets through calcination under high temperature; then perylenetetracarboxylic dianhydride and carbon nitride as raw materials, imidazole as solvent, the perylenetetracarboxylic dianhydride-modified carbon nitride is prepared under the condition of high temperature heating, the impurities in the reaction solvent are washed away with potassium carbonate, hydrochloric acid, water and ethanol. The perylenetetracarboxylic dianhydride-modified carbon nitride and graphene oxide are uniformly dispersed in deionized water, and the mixture is transferred to a reaction kettle after being subjected to ultrasonic agitation, and then subjected to freeze-drying to obtain a carbon nitride modified with perylenetetracarboxylic dianhydride/graphene oxide aerogel composite material. The aerogel composite material can increase the absorb of visible light of the photocatalytic material greatly with a suitable band gap, and has good conductivity, can improve the photocatalytic performance greatly. Therefore, the present invention discloses the application of the above 3D aerogel of graphitic carbon nitride modified with perylenetetracarboxylic dianhydride and graphene oxide composite material in the photocatalytic degradation of nitric oxide; meanwhile, the invention also discloses the application of the above material in gas pollution treatment.

Advantages of this Invention (1). The preparation method of the carbon nitride modified with perylenetetracarboxylic dianhydride/graphene oxide aerogel composite material according to the present invention is simple, the raw materials are easy to obtain, and the operation is easy, there is no expensive equipment is used in the whole process, which is very crucial for the industrialized application.

(2). In the carbon nitride modified with perylenetetracarboxylic dianhydride/graphene oxide aerogel composite material disclose in the present invention, carbon nitride exhibits good effect for the photocatalytic degradation of NO, the photocatalytic activity of carbon nitride could be further improved by modification; graphene oxide as a conductive material can improve the introduction of the electron transport efficiency greatly, thereby increasing the degradation effect; aerogel is a macroscopic material formed through the intermolecular force between materials, which is conducive to the recovery and reuse of the photocatalyst, and also can increase the adsorption effect on the gas, with good prospects for the application.

(3). The carbon nitride modified with perylenetetracarboxylic dianhydride/graphene oxide aerogel composite material disclosed by the invention is a composite material with high visible light absorption efficiency, good catalysis effect, stable performance and convenient repeated use. The new composite material has high-efficiency photocatalytic effect on the degradation of nitric oxide and can be used for the treatment of gas pollution in various environments.

DETAILED DESCRIPTION OF THE INVENTION

Example 1

Figure 1:
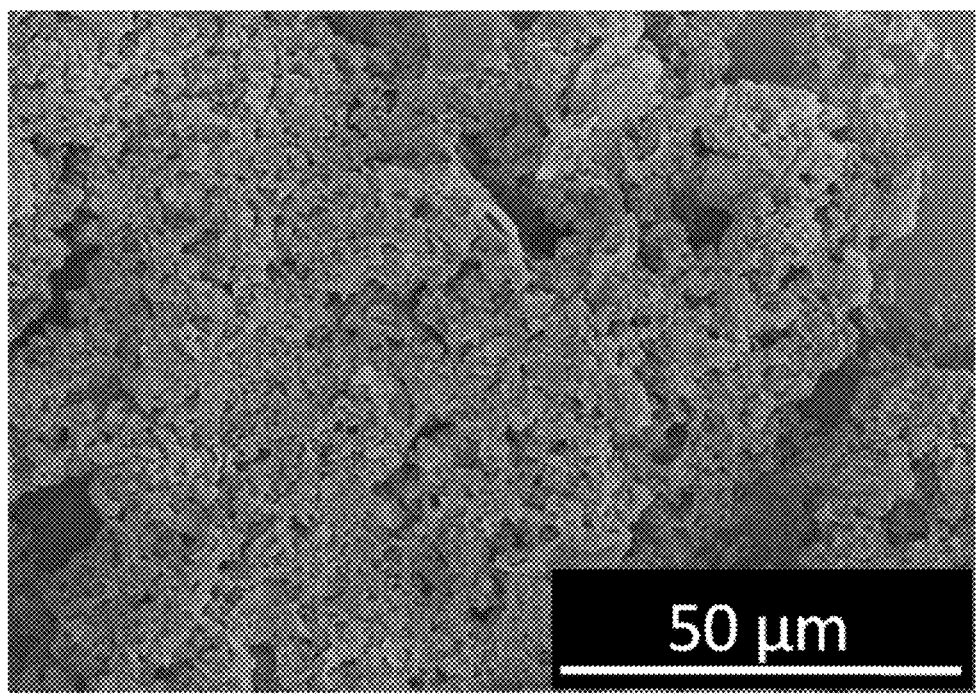
FIG. 1 is the SEM image of graphitic carbon nitride.
Figure 2:
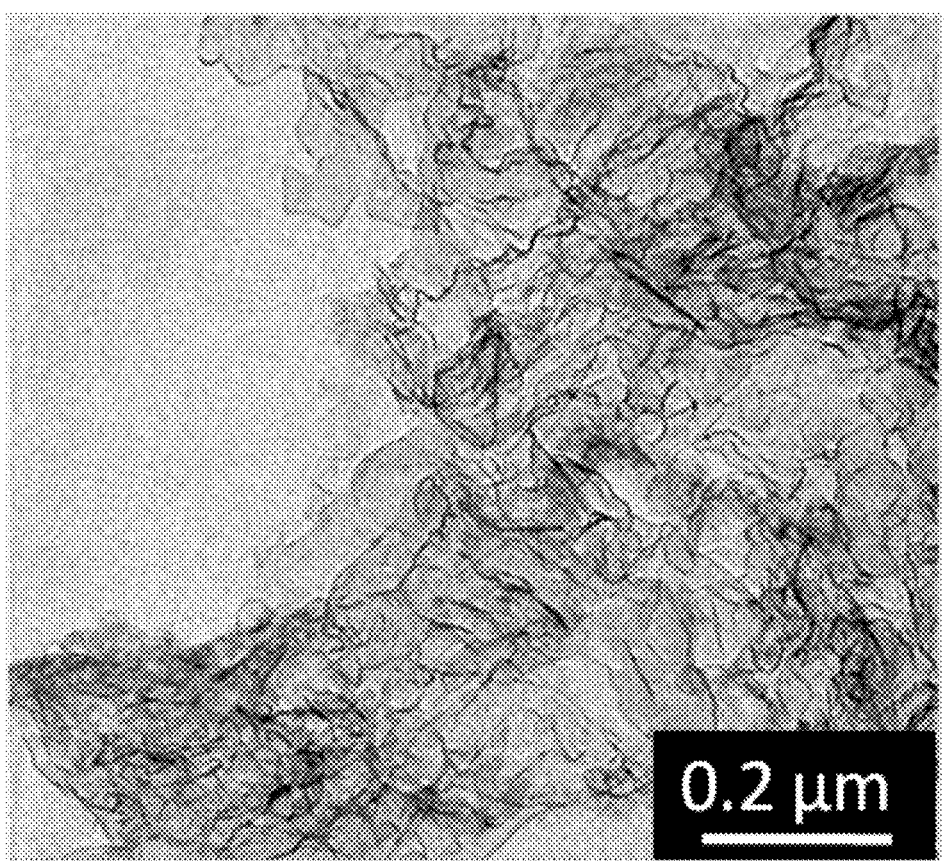
FIG. 2 is the TEM image of graphitic carbon nitride.

Preparation of graphitic carbon nitride. Specific steps are as follows:

10 g of dicyandiamide were played into a porcelain crucible, calcined for 5 hours at 600° C. at the heating rate of 10° C. per minute under argon protection, to obtain a yellow carbon nitride, and ground into powder; FIG. 1 and FIG. 2 were the SEM image and TEM image of the carbon nitride, respectively, which can be seen that carbon nitride was thin sheet structure.

Figure 3:
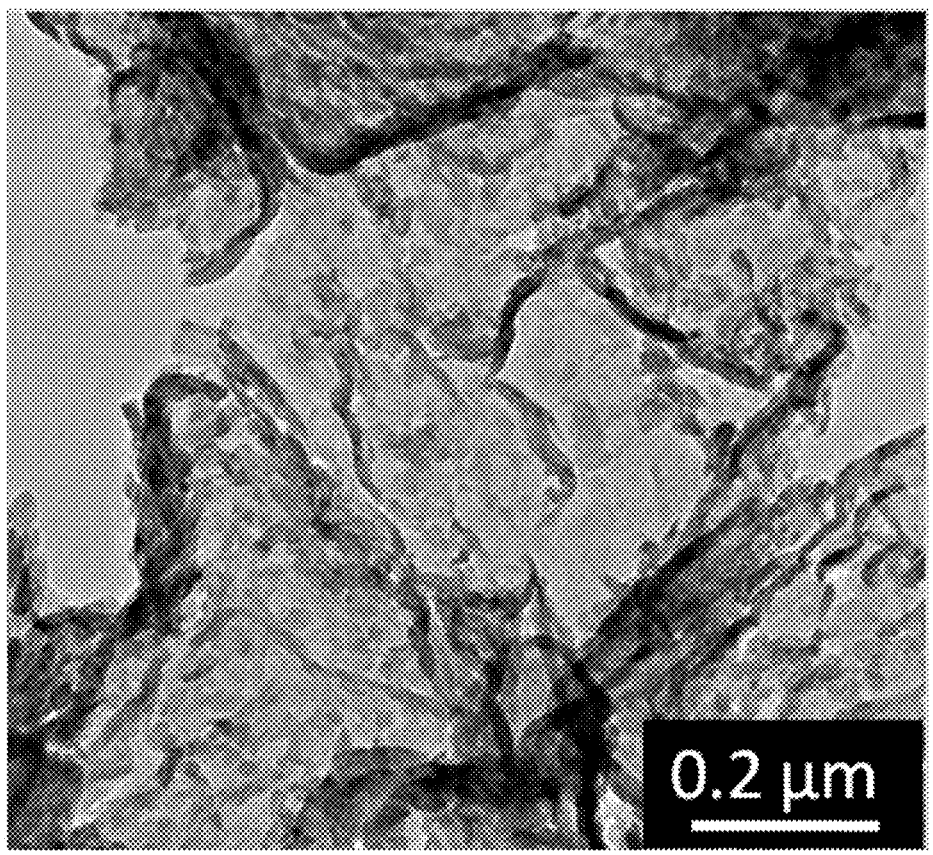
FIG. 3 is the TEM image of graphitic carbon nitride modified with perylenetetracarboxylic dianhydride.

Preparation of graphitic carbon nitride modified with perylenetetracarboxylic dianhydride. Specific steps are as follows:

0.05 g of perylenetetracarboxylic dianhydride, 1.0 g of carbon nitride and 4.0 g of imidazole were respectively added into a round-bottomed flask, in which imidazole was acted as solvent and melted into liquid under high temperature. The reaction was carried out in an oil bath and heated at 150 for 6 hours under a nitrogen gas atmosphere. After the reaction was completed, cooled to room temperature naturally, the product was transferred to a flask containing 150 ml of $K_2CO_3$ solution, refluxed for 2 hours, after the reaction was cooled to room temperature, the product was centrifuged, washed with hydrochloric acid until to neutralize the remaining lye, and then washed with water and ethanol to neutral, vacuum dried for 5 hours to obtain graphitic carbon nitride modified with perylenetetracarboxylic dianhydride; FIG. 3 is the TEM image of graphitic carbon nitride modified with perylenetetracarboxylic dianhydride, which can be seen that it is a thin sheet-like structure.

Figure 4:
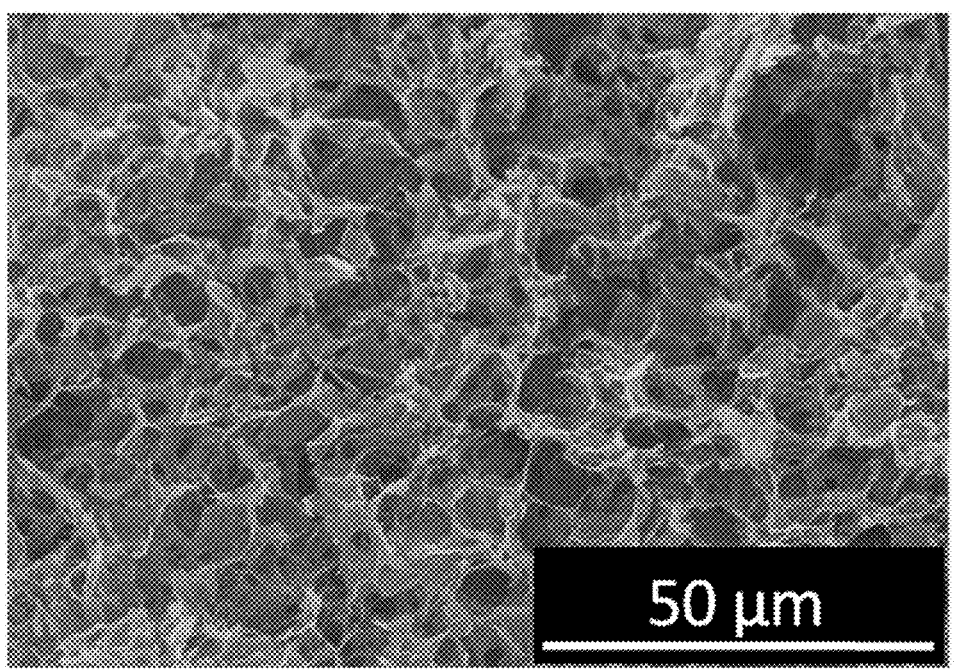
FIG. 4 is the SEM image of 3D aerogel of graphitic carbon nitride modified with perylenetetracarboxylic dianhydride and graphene oxide.
Figure 5:
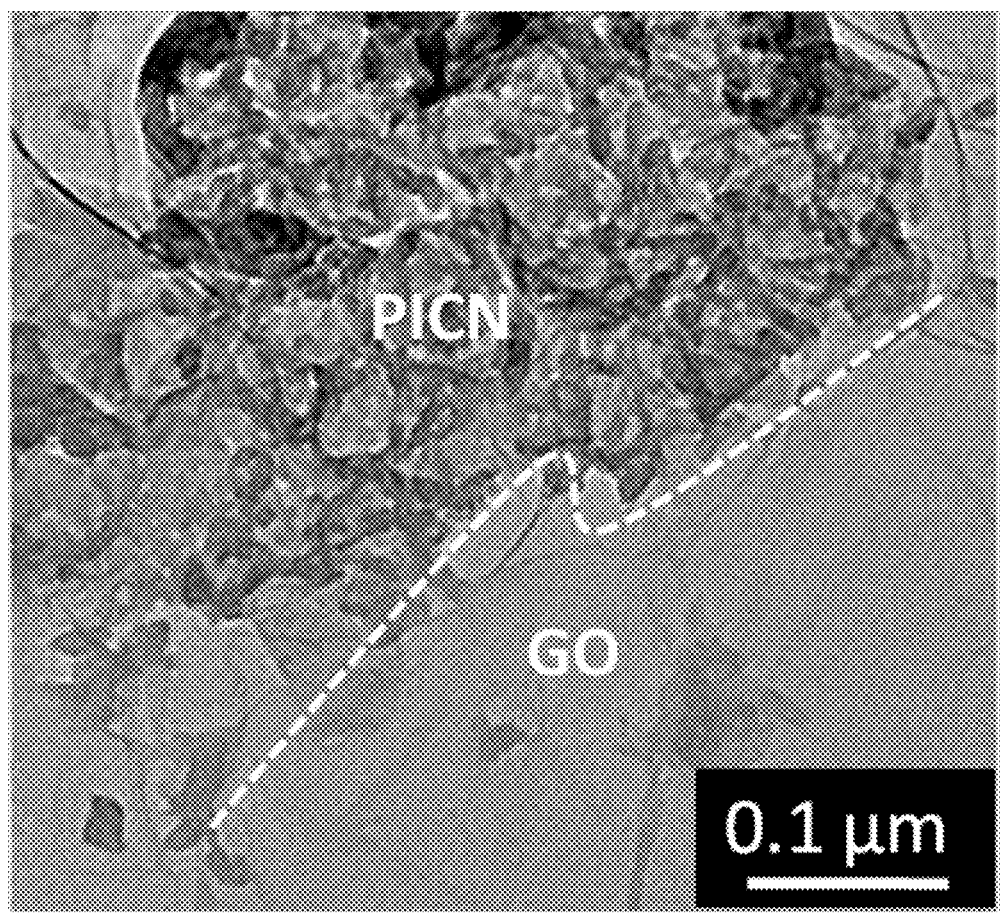
FIG. 5 is the TEM image of 3D aerogel of graphitic carbon nitride modified with perylenetetracarboxylic dianhydride and graphene oxide.

Preparation of aerogel of graphitic carbon nitride modified with perylenetetracarboxylic dianhydride and graphene oxide. Specific steps are as follows:

90 mg of graphitic carbon nitride modified with perylenetetracarboxylic dianhydride and 30 mg of graphene oxide were dispersed in 20 ml of water, stirred for 2 hours with ultrasonic agitation, and uniformly dispersed. The uniformly dispersed suspension was transferred to a Teflon-lined stainless autoclave and react at 190° C. for 6 hours. After the reaction was completed, the column was naturally cooled to room temperature to obtain a columnar hydrogel which was washed three times with deionized water. The hydrogel was then placed in a watch glass, and transferred to a freeze-drying oven for freeze-drying 2 days to finally obtain a columnar aerogel of graphitic carbon nitride modified with perylenetetracarboxylic dianhydride and graphene oxide; FIG. 4 and FIG. 5 are the SEM and TEM images of aerogel of graphitic carbon nitride modified with perylenetetracarboxylic dianhydride and graphene oxide, which showed that the material was macroporous structure and the carbon nitride and graphene were well compounded.

Example 2

Photocatalytic degradation of NO. Specific steps are as follows:

A batch reactor (2.2 liters in volume) containing one quartz glass was used for the photocatalytic degradation of nitric oxide; 50 mg of a aerogel of graphitic carbon nitride modified with perylenetetracarboxylic dianhydride and graphene oxide was placed in the batch reactor, the door was closed, the reactor was evacuated, the flow rate of high purity air (1 liter) and nitric oxide (concentration of 100 ppm) was adjusted so that the flow rate of the mixed gas was 2.4 liters per minute, until the concentration of nitrogen oxide concentration stabilized at 600 ppb for fifteen minutes, a xenon light was turned on to initiate the photodegradation reaction. The aerogel of graphitic carbon nitride modified with perylenetetracarboxylic dianhydride and graphene oxide composite photocatalyst can be recycled many times, With good stability, recycling after 4 times, still have a good catalytic effect.

Figure 6:
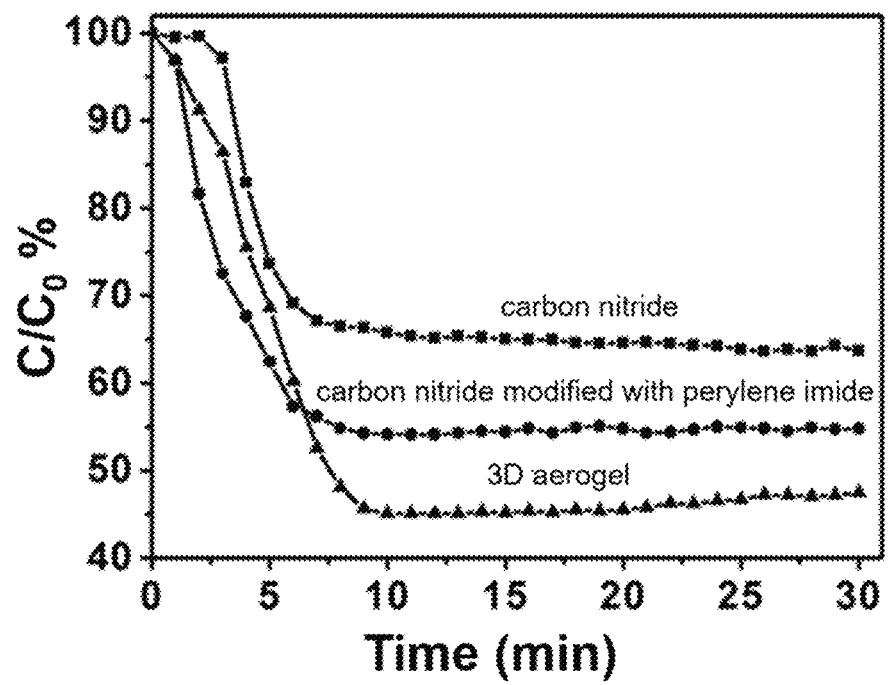
FIG. 6 is effect of photocatalytic degradation NO by the composites.
Figure 7:
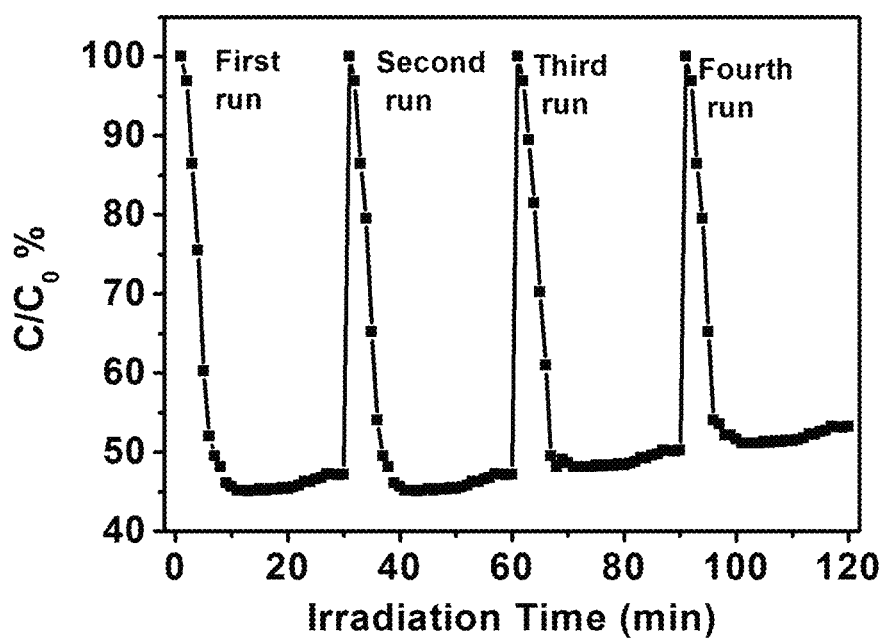
FIG. 7 is cycling runs for the photocatalytic degradation of NO over 3D aerogel of graphitic carbon nitride modified with perylenetetracarboxylic dianhydride and graphene oxide.

FIG. 6 is the effect of photocatalytic degradation NO by the composites;

FIG. 7 is the photocatalytic material recycling effect.

Through the above analysis shows that the aerogels in this present invention were synthesized through a simple method and has a good photocatalytic effect for NO removal; and can be recycled many times, and the preparation process is simple, the raw materials are easy to obtain. This composite photocatalyst has the application prospects in the treatment of nitric oxide gas pollution.

What is claimed is:

1. A preparation method of carbon nitride modified with perylenetetracarboxylic dianhydride/graphene oxide aerogel composite material, characterized in comprising the following steps:
    (1) preparing carbon nitride nanosheets by calcination using dicyandiamide as raw material;
    (2) reacting perylenetetracarboxylic dianhydride and carbon nitride nanosheets in imidazole to prepare carbon nitride modified with perylenetetracarboxylic dianhydride;
    (3) dispersing said carbon nitride modified with perylenetetracarboxylic dianhydride and graphene oxide into deionized water, freeze-drying after the reaction to obtain carbon nitride modified with perylenetetracarboxylic dianhydride/graphene oxide aerogel composite material.

2. The preparation method of carbon nitride modified with perylenetetracarboxylic dianhydride/graphene oxide aerogel composite material according to claim 1, wherein in step (1), the calcination is carried out at 400 to 700° C. for 3 to 6 hours under the protection of argon, the rate of temperature rise during calcination is 2 to 15° C. per minute.

3. The preparation method of carbon nitride modified with perylenetetracarboxylic dianhydride/graphene oxide aerogel composite material according to claim 1, wherein in step (2), the mass ratio of perylenetetracarboxylic dianhydride, carbon nitride nanosheets and imidazole is 1:30:120; the reaction is carried out at 130 to 160° C. for 4 to 7 hours.

4. The preparation method of carbon nitride modified with perylenetetracarboxylic dianhydride/graphene oxide aerogel composite material according to claim 1, wherein in step (2), after the reaction, the product is added to an aqueous solution of $K_2CO_3$, refluxed for 1 to 3 hours, cooled to room temperature, then centrifuged, washed with hydrochloric acid, and then washed with water and ethanol until neutral, and finally vacuum dried for 3 to 6 hours to prepare carbon nitride modified with perylenetetracarboxylic dianhydride.

5. The preparation method of carbon nitride modified with perylenetetracarboxylic dianhydride/graphene oxide aerogel composite material according to claim 1, wherein in step (3), the mass ratio of said nitride modified with perylenetetracarboxylic dianhydride and said graphene oxide is 3:1; taking ultrasonic treatment after dispersing in deionized water, the reaction is carried out at 160 to 200° C. for 5 to 8 hours; said freeze-drying is keeping in a freeze drying oven for 1 to 2 days.

6. Carbon nitride modified with perylenetetracarboxylic dianhydride/graphene oxide aerogel composite material prepared by the preparation method of carbon nitride modified with perylenetetracarboxylic dianhydride/graphene oxide aerogel composite material according to claim 1.

7. A preparation method of carbon nitride modified with perylenetetracarboxylic dianhydride/graphene oxide aerogel composite material, characterized in comprising the following steps:
    (1) preparing carbon nitride nanosheets by calcination using dicyandiamide as raw material;
    (2) reacting perylenetetracarboxylic dianhydride and carbon nitride nanosheets in imidazole to prepare carbon nitride modified with perylenetetracarboxylic dianhydride;
    (3) dispersing said carbon nitride modified with perylenetetracarboxylic dianhydride and graphene oxide into deionized water to obtain carbon nitride modified with perylenetetracarboxylic dianhydride/graphene oxide aerogel composite material.

8. The preparation method of carbon nitride modified with perylenetetracarboxylic dianhydride/graphene oxide aerogel composite material according to claim 7, wherein in step (1), the calcination is carried out at 400 to 700° C. for 3 to 6 hours under the protection of argon, the rate of temperature rise during calcination is 2 to 15° C. per minute; in step (2), the mass ratio of perylenetetracarboxylic dianhydride, carbon nitride nanosheets and imidazole is 1:30:120; the reaction is carried out at 130 to 160° C. for 4 to 7 hours; in step (3), the mass ratio of said nitride modified with perylenetetracarboxylic dianhydride and said graphene oxide is 3:1; taking ultrasonic treatment after dispersing in deionized water, the reaction is carried out at 160 to 200° C. for 5 to 8 hours.

9. Carbon nitride modified with perylenetetracarboxylic dianhydride/graphene oxide aerogel composite material prepared by the preparation method of carbon nitride modified with perylenetetracarboxylic dianhydride/graphene oxide aerogel composite material according to claim 7.

* * * * *